(12) United States Patent
Yi et al.

(10) Patent No.: US 9,034,533 B2
(45) Date of Patent: May 19, 2015

(54) FUEL CELL STACK AND FUEL CELL SYSTEM WITH PLURALITY OF GENERATION MODULES

(75) Inventors: Jung Seok Yi, Seoul (KR); Tae-won Song, Yongin-si (KR); Hee-young Sun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 486 days.

(21) Appl. No.: 12/755,624

(22) Filed: Apr. 7, 2010

(65) Prior Publication Data
US 2010/0266918 A1 Oct. 21, 2010

(30) Foreign Application Priority Data

Apr. 16, 2009 (KR) .................. 10-2009-0033192

(51) Int. Cl.
*H01M 8/04* (2006.01)
*H01M 8/24* (2006.01)
*H01M 8/02* (2006.01)

(52) U.S. Cl.
CPC ............ *H01M 8/04082* (2013.01); *H01M 8/24* (2013.01); *H01M 8/04007* (2013.01); *H01M 8/04* (2013.01); *H01M 8/0494* (2013.01); *H01M 8/2405* (2013.01); *H01M 8/248* (2013.01); *H01M 8/249* (2013.01); *H01M 8/0267* (2013.01); *H01M 8/04074* (2013.01); *H01M 8/04604* (2013.01); *H01M 8/04089* (2013.01); *Y02E 60/50* (2013.01)

(58) Field of Classification Search
CPC .................................................. H01M 8/04082
See application file for complete search history.

(56) References Cited

U.S. PATENT DOCUMENTS

| 6,050,331 | A * | 4/2000 | Breault et al. ................. 165/168 |
| 7,081,313 | B2 | 7/2006 | Resnick et al. |
| 7,112,381 | B2 | 9/2006 | Wakabayashi et al. |
| 7,166,985 | B1 | 1/2007 | Arikara et al. |
| 2003/0091884 | A1* | 5/2003 | Scartozzi ........................ 429/32 |
| 2004/0146756 | A1* | 7/2004 | Boehm .......................... 429/13 |
| 2005/0112419 | A1* | 5/2005 | Zheng et al. .................... 429/13 |
| 2005/0266286 | A1* | 12/2005 | Sato et al. ........................ 429/26 |
| 2006/0172176 | A1* | 8/2006 | MacBain et al. ................. 429/38 |
| 2006/0177722 | A1 | 8/2006 | Inagaki |
| 2008/0107933 | A1 | 5/2008 | Gallagher |
| 2009/0110993 | A1* | 4/2009 | Backhaus-Ricoult et al. .. 429/32 |

FOREIGN PATENT DOCUMENTS

| JP | 05-242903 | 9/1993 |
| JP | 2005-056814 | 3/2005 |
| JP | 2005-078859 | 3/2005 |
| JP | 2006-236792 | 9/2006 |
| JP | 2007-227278 | 9/2007 |
| KR | 2003-0070057 | 8/2003 |
| KR | 10-2007-0059183 | 6/2007 |

* cited by examiner

*Primary Examiner* — Ula C Ruddock
*Assistant Examiner* — Tony Chuo
(74) *Attorney, Agent, or Firm* — Lee & Morse, P.C.

(57) ABSTRACT

A fuel cell has a structure in which generation modules are stacked. In each of the generation modules, there are cells are stacked. Each of the cells generates unitary power from fuel energy. A fuel cell system including the fuel stack operates either all or some of the generation modules in consideration of the quantity of power consumed by a load.

13 Claims, 7 Drawing Sheets

FUEL CELL STACK AND FUEL CELL SYSTEM WITH PLURALITY OF GENERATION MODULES

CROSS-REFERENCE TO RELATED APPLICATION

This application claims the benefit of Korean Patent Application No. 10-2009-0033192, filed Apr. 16, 2009 in the Korean Intellectual Property Office, the disclosure of which is incorporated herein by reference.

STATEMENT OF JOINT RESEARCH AGREEMENT

This invention is a product of a joint research agreement between Samsung SDI Co., Ltd. and Samsung Electronics Co., Ltd.

BACKGROUND OF THE INVENTION

1. Field

One or more embodiments relate to a fuel cell stack and a fuel cell system including the fuel cell stack.

2. Description of the Related Art

A fuel cell generates electric energy from materials abundant on the earth. An example is hydrogen. The fuel cell is being focused on as one of a number of environmentally friendly alternative energy technologies, which also includes solar cells. Generally, a fuel cell has a stack structure having a stack of cells. Each cell generates unitary power. For the generation of a large amount of power, either the number of cells constituting a fuel cell stack is increased, or a plurality of fuel cell stacks are connected either in parallel or in series.

Generation efficiency of a fuel cell stack is determined by a ratio of a quantity of power generated by the fuel cell stack to a quantity of fuel supplied to the fuel cell stack. Generally, fuel, the quantity of which is at or above a predetermined amount, is supplied to a fuel stack to maintain a constant quantity of fuel injected into the fuel stack even in a case of a partial load at which a ratio of the quantity of power consumed by a load to the quantity of generatable power is less than or equal to 50%. The reason for this is that inlet gas pressure equal to or above a predetermined value is necessary for fuel to flow within a fuel cell stack. Thus, when a fuel cell stack operates at partial load, generation efficiency of the fuel cell stack is deteriorated.

SUMMARY

One or more embodiments include a fuel cell stack and a fuel cell system that may maintain constant generation efficiency of the fuel cell stack even when the fuel cell stack operates at partial load.

To achieve the above and/or other aspects, one or more embodiments may include a fuel cell stack including a plurality of generation modules; and a plurality of insulator plates that are disposed between the generation modules and insulate the generation modules, wherein each of the generation modules includes a plurality of cells, each of which generates unitary power from fuel energy; and a plurality of current collector plates which collect power generated by the cells.

To achieve the above and/or other aspects, one or more embodiments may include a fuel cell system including a plurality of fuel cell stacks, in which a plurality of generation modules are stacked, and in each of the generation modules a plurality of cells are stacked, each of which generates unitary power from fuel energy; a control unit which generates a control signal for controlling operations of either all or some of the generation modules in consideration of a quantity of power consumed by a load; and a power converter which converts power output by either all or some of the generation modules into power to be supplied to the load according to the control signal generated by the control unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
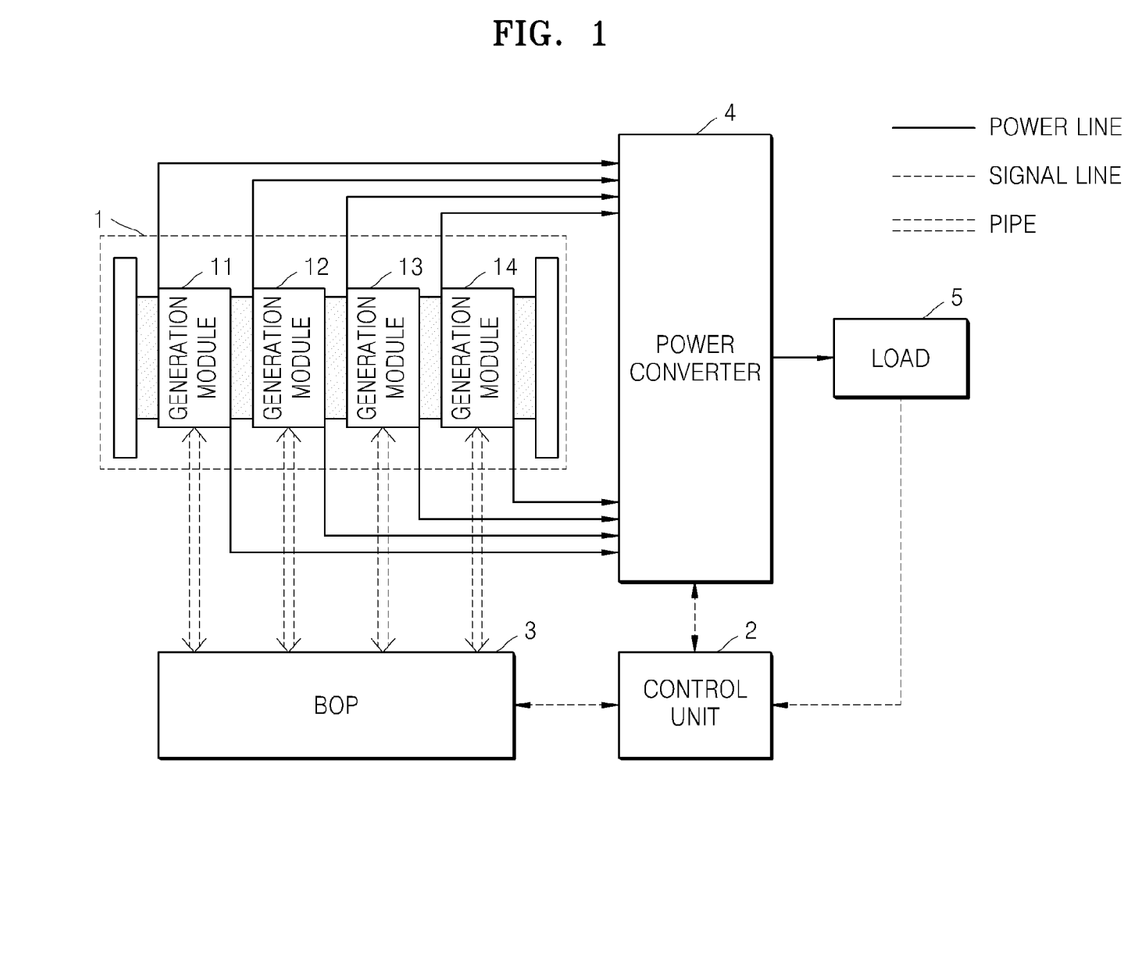
FIG. 1 is a block diagram of a fuel cell system according to an embodiment of the present invention.

FIG. 1 is a block diagram of a fuel cell system according to an embodiment of the present invention. Referring to FIG. 1, the fuel cell system includes a fuel cell stack 1, a control unit 2, a balance of plant (BOP) 3, and a power converter 4. The fuel cell stack 1 has a structure in which a plurality of generation modules are stacked, wherein a plurality of cells, are stacked in each of the generation modules 11 to 14. Each cell generates a unit of power from fuel energy.

Figure 2:
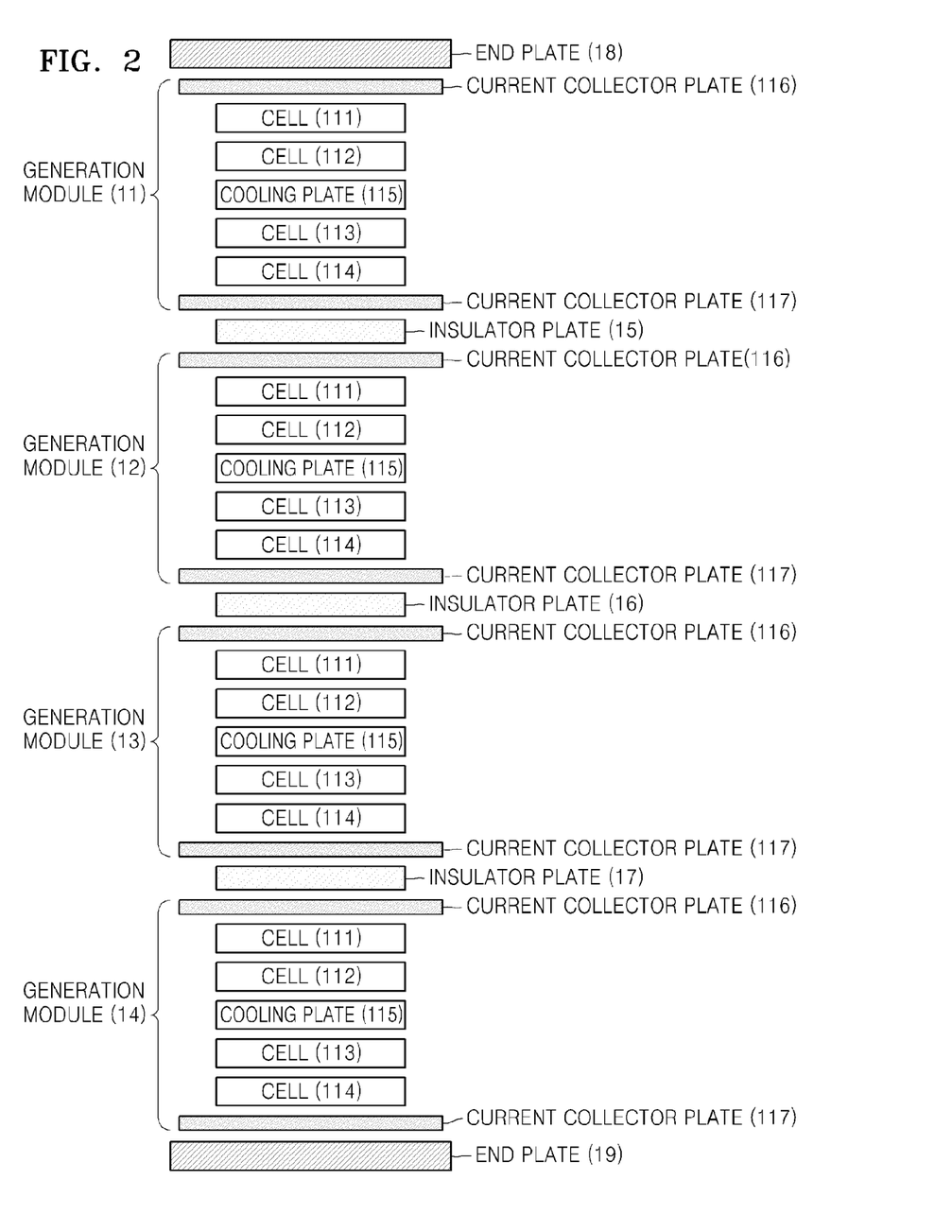
FIG. 2 is a detailed block diagram of a fuel cell stack shown in FIG. 1.

FIG. 2 is a detailed block diagram of the fuel cell stack 1 shown in FIG. 1. Referring to FIG. 2, the fuel cell stack 1 includes four generation modules 11 through 14. Insulator plates 15 through 17 are located between the generation modules 11 through 14 to insulate electrically the generation modules 11 through 14. Two end plates 18 and 19 keep the generation modules 11 through 14 clamped firmly together. The end plates 18, 19 may also be referred to as pressure plates. Accordingly, the fuel cell stack 1 includes only two end plates 18 for a plurality of independent generation modules 11 through 14. Thus, the size of the fuel cell stack 1 may be smaller compared to a fuel cell system in which a plurality of fuel cell stacks are connected in parallel or in series. The end plates 18 and 19 shown in FIG. 2 have integrated insulating plates, which are in contact with the corresponding current collector plates 116,117 that are contacting the end plates 18 and 19, respectively.

The four shown generation modules 11 through 14 are merely an example, and it should be understood that the number of generation modules may vary. According to the related art, a whole fuel cell stack is replaced in the case where some cells in the fuel cell stack are broken. However, according to the embodiment, an individual generation module 11, 12, 13, 14 may be replaced. Thus, only a generation module including broken cells may be replaced, and thus a fuel cell stack may be easily repaired.

Furthermore, the generation module 11 includes four cells 111 through 114. Each cell 111,112,113,114 generates unitary power from fuel energy. The module 11 further includes a cooling plate 115, which is disposed between the cells 111 through 114 and cools the cells 111 through 114. The module 11 further includes two current collector plates 116 and 117, which are respectively adjacent to the two outermost cells 111 and 114. Each of the cells 111 through 114 is a generation device which generates direct current (DC) power by directly converting chemical fuel energy into electric power through an electrochemical reaction.

As shown in FIG. 2, the generation modules 11 through 14 are stacked between the two end plates 18 and 19, and the cells 111 through 114 are stacked between the two current collector plates 116 and 117 of each cell. Each of the cells 111 through 114 includes a cathode plate, to which fuel, e.g. hydrogen, is supplied, a proton exchange membrane, which does not transmit electrons separated from hydrogen and only transmits protons, and an anode plate to which air, that is, oxygen, is supplied. In other words, a surface of each of the cells 111 through 114 is the anode plate, and the other surface of each of the cells 111 through 114 is the cathode plate.

The end plates 18 and 19 clamp the generation modules 11 through 14 together at a clamping pressure at which electric current may flow between the outermost cells 111 and 114 among the cells 111 through 114 and the current collector plates 116 and 117. For example, if the current collector plate 116 is an anode and the current collector plate 117 is a cathode, the end plates 18 and 19 clamp the generation modules 11 through 14 together at a suitable clamping pressure, so that electric current may flow between the anode plates of the current collector plate 116 and the cell 111, between the cathode plate of the cell 111 and the anode plate of the cell 112', between the anode plate of the cell 112 and the cooling plate 115', between the cooling plate 115 and the anode plate of the cell 113', between the cathode plate of the cell 113 and the anode plate of the cell 114', and between the anode plate of the cell 114 and the current collector plate 116. It is identically applied to the other generation modules 12 and 13. The end plates 18 and 19 may be clamped with clamping components penetrating the fuel cell stack 1. Examples of clamping components include a bolt and a nut, but the invention is not limited thereto.

The control unit 2 generates a signal for controlling operations of either all or a part of the generation modules 11 through 14 in consideration of quantity of power consumed by a load 5. In other words, based on a result fed back from the load 5, the control unit 2 calculates a ratio of quantity of power consumed by the load 5 with respect to a total quantity of power that may be supplied by the power converter 4, and generates a signal for controlling operations of either all or a part of the generation modules 11 through 14 according to the calculated ratio. While not required in all aspects, the control unit 2 can include one or more processors executing software and/or firmware stored in a computer readable medium.

For example, if the ratio of quantity of power consumed by the load 5 with respect to the total quantity of power that may be supplied by the power converter 4 is from 51% to 100%, the control unit 2 generates a signal for controlling operations of all of the generation modules 11 through 14. If the ratio of quantity of power consumed by the load 5 with respect to the total quantity of power that may be supplied by the power converter 4 is from 26% to 50%, the control unit 2 generates a signal for controlling operations of half of the generation modules 11 through 14. If the ratio of quantity of power consumed by the load 5 with respect to the total quantity of power that may be supplied by the power converter 4 is less than or equal to 26%, the control unit 2 generates a signal for controlling operations of one of the generation modules 11 through 14.

A fuel cell stack according to the related art exhibits fuel efficiency equal to or above 80% in the case where the ratio of quantity of power consumed by the load 5 with respect to the total quantity of power that may be supplied by the power converter 4 is from 51% to 100%. Meanwhile, a fuel cell stack according to the current embodiment may exhibit fuel efficiency equal to or above 80% regardless of the ratio of quantity of power consumed by the load 5 with respect to the total quantity of power that may be supplied by the power converter 4. In other words, according to the current embodiment, only a number of the generation modules, where the number is proportional to the quantity of power consumed by the load 5, operate. Thus, fuel efficiency of the generation modules may be significantly improved. Further, since it is not necessary to increase the temperature of the entire fuel cell stack 1, a start-up time of the fuel cell stack 1 may be reduced. Also, even in the case of a partial load in which the ratio of quantity of power consumed by the load 5 with respect to the total quantity of power that may be supplied by the power converter 4 is less than or equal to 50%, each of the generation modules 11, 12, 13, 14 may operate at a high current density, and thus, is efficient.

Furthermore, the control unit 2 may also generate a signal for controlling operations of each of the generation modules 11 through 14 in consideration of the operating history of each of the generation modules 11 through 14 as well as the quantity of power consumed by the load 5. The control unit 2 determines priorities among the generation modules 11 through 14 based on the operating history of each of the generation modules 11 through 14, e.g. an operating time of each of the generation modules 11 through 14, and generates a signal for controlling operations of each of the generation modules 11 through 14 according to the priorities. In other words, an operating time may be evenly distributed to each of the generation modules 11 through 14 by allocating higher priorities from one of the generation modules 11 through 14 with the shorter operating time. Thus, overall durability of the fuel cell stack 1 may be improved. Such history can be stored in a memory of the control unit 2.

The BOP 3 includes peripheral devices for operating cells in the generation modules 11 through 14. The BOP 3 includes a pump for supplying fuel (e.g. hydrogen) a pump for supplying an oxidizer (e.g. air or oxygen), to oxidize the fuel, and a pump for supplying coolant, to each of the cells in the generation modules 11 through 14. The BOP 3 supplies fuel, air, and coolant to either all or some of the generation modules 11 through 14 designated by a control signal generated by the control unit 2. When the fuel cell system shown in FIG. 1 is started, the BOP 3 is operated using either power supplied by a power source. Examples of the power source can include a separate battery within or connected to the fuel cell system (not shown), a large-capacity capacitor (not shown), power supplied from outside of the fuel cell system, or combinations thereof. The BOP 3 operates the generation modules 11 through 14, and, when constant DC power is output by the generation modules 11 through 14, the BOP 3 operates using power supplied from the generation modules 11 through 14.

According to a control signal generated by the control unit 2, the power converter 4 converts power output by either all or some of the generation modules 11 through 14 into power to be supplied to the load 5. The power converter 4 is a DC-DC converter, which is controlled by the control unit 2 to convert voltage generated by either all or some of the generation modules 11 through 14 into voltage suitable for the load 5. The power converter 4 may be controlled by the control unit 2 either to supply a higher voltage to the load 5 by connecting the generation modules 11 through 14 in series or to supply a higher current to the load 5 by connecting the generation modules 11 through 14 in parallel.

According to the current embodiment, each of the generation modules 11 through 14 may have a different number of cells. For example, the generation module 11 may have 4 cells, the generation module 12 may have 3 cells, the generation module 13 may have 2 cells, and the generation module 14 may have 1 cell. Thus, a fuel cell system according to the current embodiment may operate each of the generation modules 11 through 14 to more accurately satisfy the quantity of power consumed by the load 5.

Figure 3A:
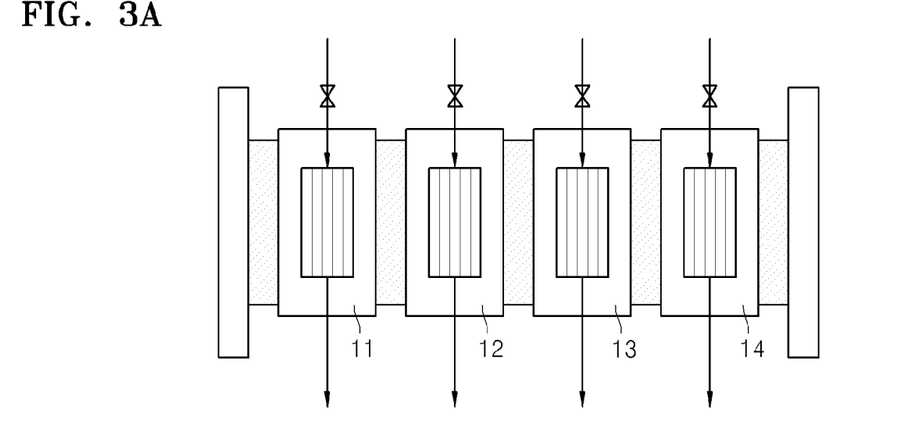
FIGS. 3A-3C are diagrams showing a piping structure of the fuel cell stack according to embodiments of the present invention.
Figure 3B:
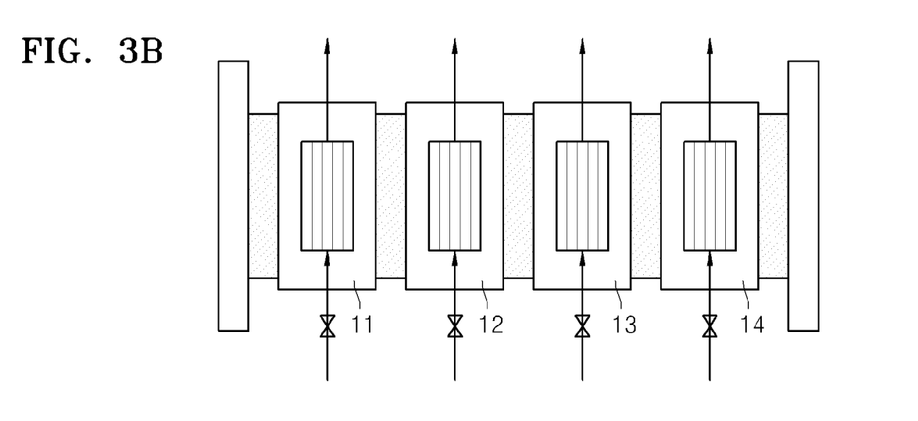
Figure 3C:
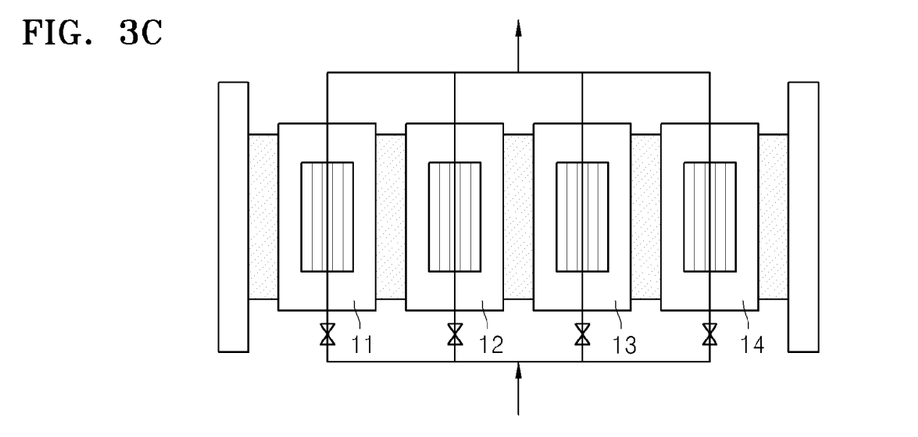

FIGS. 3A to 3C are diagrams showing the piping structure of the fuel cell stack 1 according to an embodiment of the present invention. FIG. 3A shows a fuel flow configuration; FIG. 3B shows an air flow configuration; and FIG. 3C shows a coolant configuration. Referring to FIG. 3A, pipes for individually supplying fuel are connected to each of the generation modules 11 through 14. Referring to FIG. 3B, pipes for individually supplying an oxidizer (e.g. air), are connected to each of the generation modules 11 through 14. Referring to FIG. 3C, pipes for individually supplying coolant are connected to each of the generation modules 11 through 14. As shown in FIGS. 3A through 3C, valves are installed between the pipes and the generation modules 11 through 14. The control unit 2 may control operations of either all or some of the generation modules 11 through 14 by controlling opening/closing of each of the valves. Alternatively, the control unit 2 may control operations of either all or some of the generation modules 11 through 14 by controlling the BOP 3 to supply fuel, air, and coolant to either all or some of the generation modules 11 through 14. Furthermore, valves may be installed in portions of the pipes from which the fuel, air, and coolant are discharged, to avoid backflow of the fuel, air, and coolant.

Figure 4A:
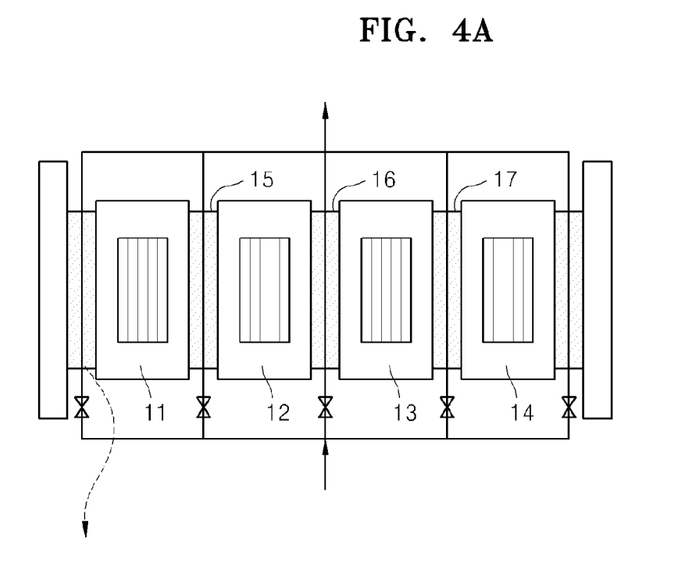
FIGS. 4A-4D are diagrams showing structures of each of insulator plates of a fuel cell stack according to embodiments of the present invention.
Figure 4B:
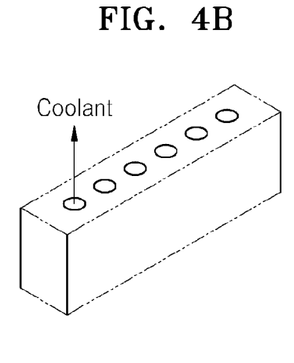
Figure 4C:
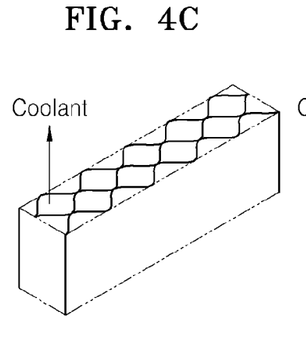
Figure 4D:
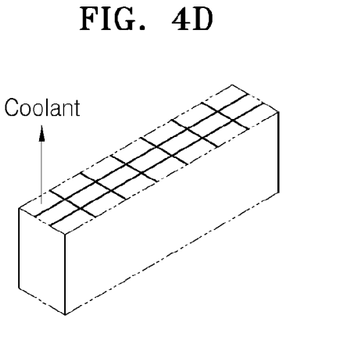

FIGS. 4A through 4D are diagrams showing the structures of each of the insulator plates 15 through 17 of the fuel cell stack 1 according to embodiments of the present invention. Referring to FIG. 4A, each of the insulator plates 15 through 17 has both an insulating function and a cooling function. Thus, a path, in which coolant for cooling cells in the generation modules 11 through 14 flows, is formed in each of the insulator plates 15 through 17. For higher cooling efficiency, the structure of the path, in which coolant flows, is channeled as shown in FIG. 4B, is corrugated as shown in FIG. 4C, or is meshed as shown in FIG. 4D.

Each of the insulator plates 15 through 17 may be entirely formed of an insulation material. Alternatively, for higher cooling efficiency, the interior portion of an insulator plate including a path in which coolant flows may be formed of a material having excellent heat conductivity, and only the surfaces of the insulator plate contacting cells may be formed of an insulation material. Here, a material having excellent heat conductivity refers to a material of which heat conductivity is equal to or above a predetermined value, and generally refers to a metal. For example, heat conductivity of copper, which is known as a material with excellent heat conductivity, is 390 W/m·K, and the interior portions of each of the insulator plates 15 through 17 may be formed of a material of which heat conductivity is equal to or above 390 W/m·K. Examples of an insulation material may include polymers, organic composite materials, inorganic composite materials, ceramic materials, etc.

Figure 5A:
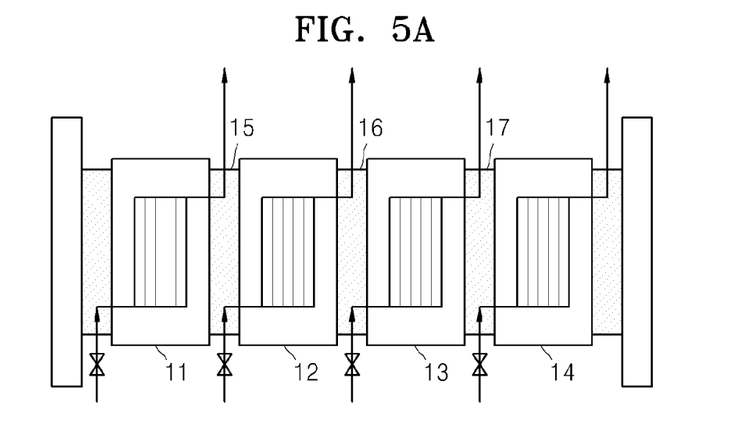
FIGS. 5A-5C are diagrams showing different types of structures of each of insulator plates, according to embodiments of the present invention.
Figure 5B:
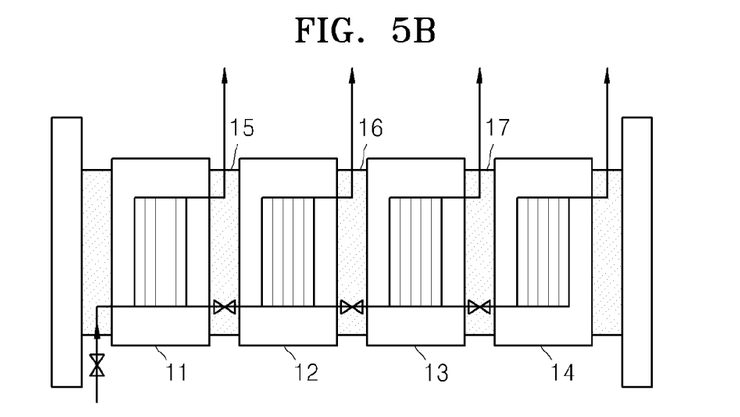
Figure 5C:
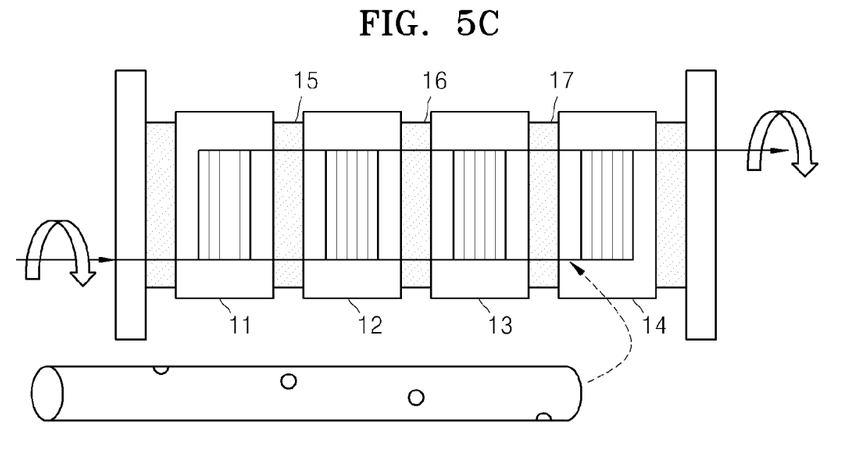

FIGS. 5A through 5C are diagrams showing different types of structures of each of the insulator plates 15 through 17, according to an embodiment of the present invention. Referring to FIGS. 5A through 5C, each of the insulator plates 15 through 17 shown in FIG. 2 has both an insulating function and a gas supplying function. Thus, a path, in which gas flows, is formed in each of the insulator plates 15 through 17. Here, the gas may be hydrogen gas, which is a fuel, or may be air or oxygen, which is an oxidizer. Although descriptions below may be in regard to a path in which a single type of gas flows, it should be understood that a plurality of such paths may be formed in parallel, so that two different gases may respectively flow in the paths.

A path for injecting gas into one of the generation modules 11 through 14 and for discharging the injected gas from one of the generation modules 11 through 14 is formed in each of the insulator plates 15 through 17 shown in FIG. 5A. A common path for supplying gas to each of the generation modules 11 through 14 and a path for discharging the injected gas from one of the generation modules 11 through 14 are formed in each of the insulator plates 15 through 17 shown in FIG. 5B. A valve is installed in a portion of the common path between adjacent pairs of generation modules, such as between modules 11 and 12, 12 and 13, and 13 and 14 as shown. The control unit 2 may control operations of either all or some of the generation modules 11 through 14 by controlling opening and closing of the valve installed between pairs of generation modules 11, 12, 13, 14. If the control unit 2 controls all valves to be opened, all of the generation modules 11 through 14 operate. If the control unit 2 controls the rightmost valve to be closed, only the generation modules 11 and 13 operate. If the control unit 2 controls the rightmost valve and a valve in the middle to be closed, only the generation modules 11 through 12 operate. If the control unit 2 controls all valves installed between two generation modules, only the generation module 11 operates.

Gas distribution pipes penetrating the insulator plates 15 through 17 are disposed in paths in the insulator plates 15 through 17 shown in FIG. 5C. Holes having a same diameter are formed in portions of the gas distribution pipes. That is, the portions penetrating the insulator plates 15 through 17. Angles of a part of the holes formed in each of the portions are different from angles of a corresponding part of the holes formed in other portions, and angles of remaining parts of the holes formed in each of the portions are the same with respect to either all or some of the insulator plates 15 through 17. The paths in the insulator plates 15 through 17 are connected to the fuel pipes of each of the generation modules 11 through 14. The BOP 3 further includes a device (e.g. a motor) to revolve the gas distribution pipes. The control unit 2 controls operations of the device for revolving the gas distribution pipes in consideration of the quantity of power consumed by the load 5. Referring to FIG. 5C, gas to be supplied to the generation modules 11 through 14 is injected to an inlet of one of the gas distribution pipes, and the gas may be supplied to either all or some of the generation modules 11 through 14 as the control unit 2 controls an angle of revolution of the gas distribution pipes.

Figure 6A:
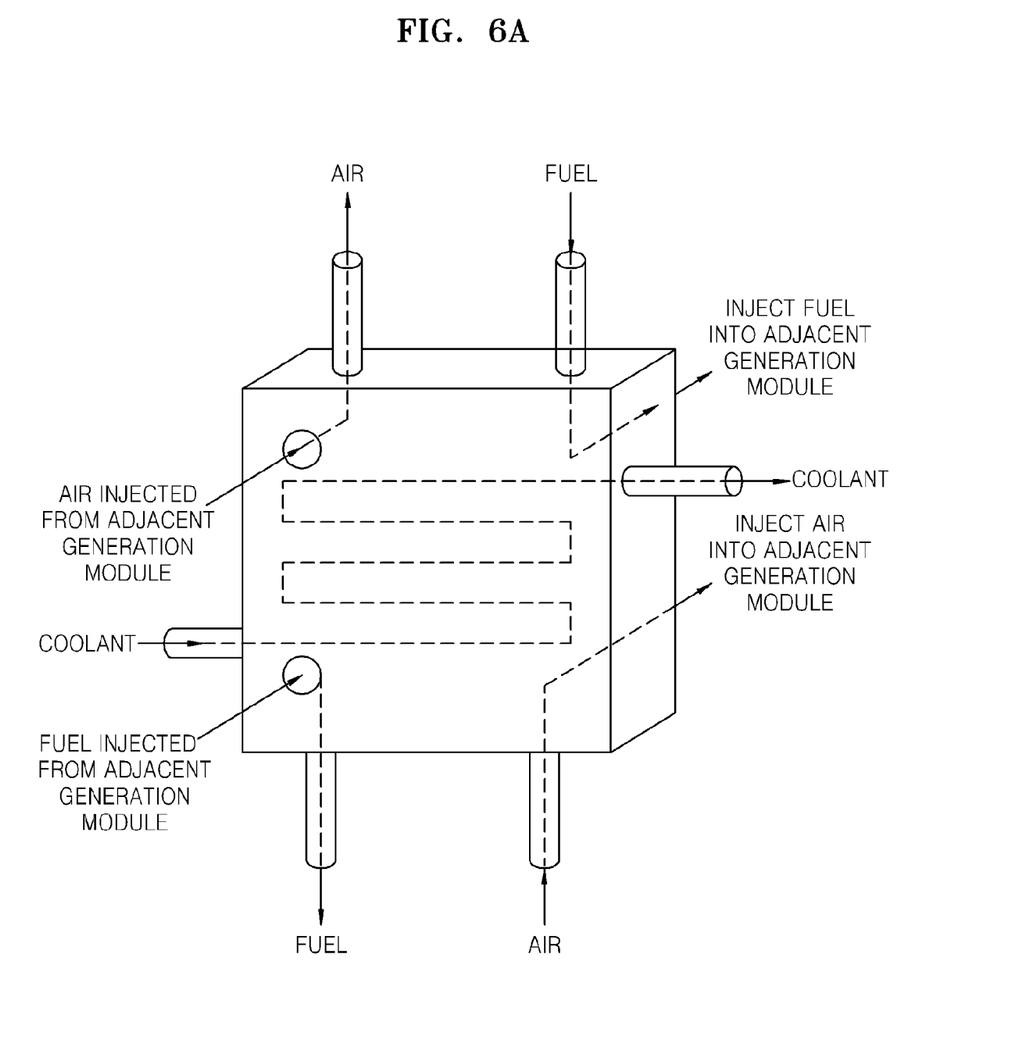
FIGS. 6A and 6B are diagrams showing other structures of insulator plates of a fuel cell stack according to an embodiment of the present invention.
Figure 6B:
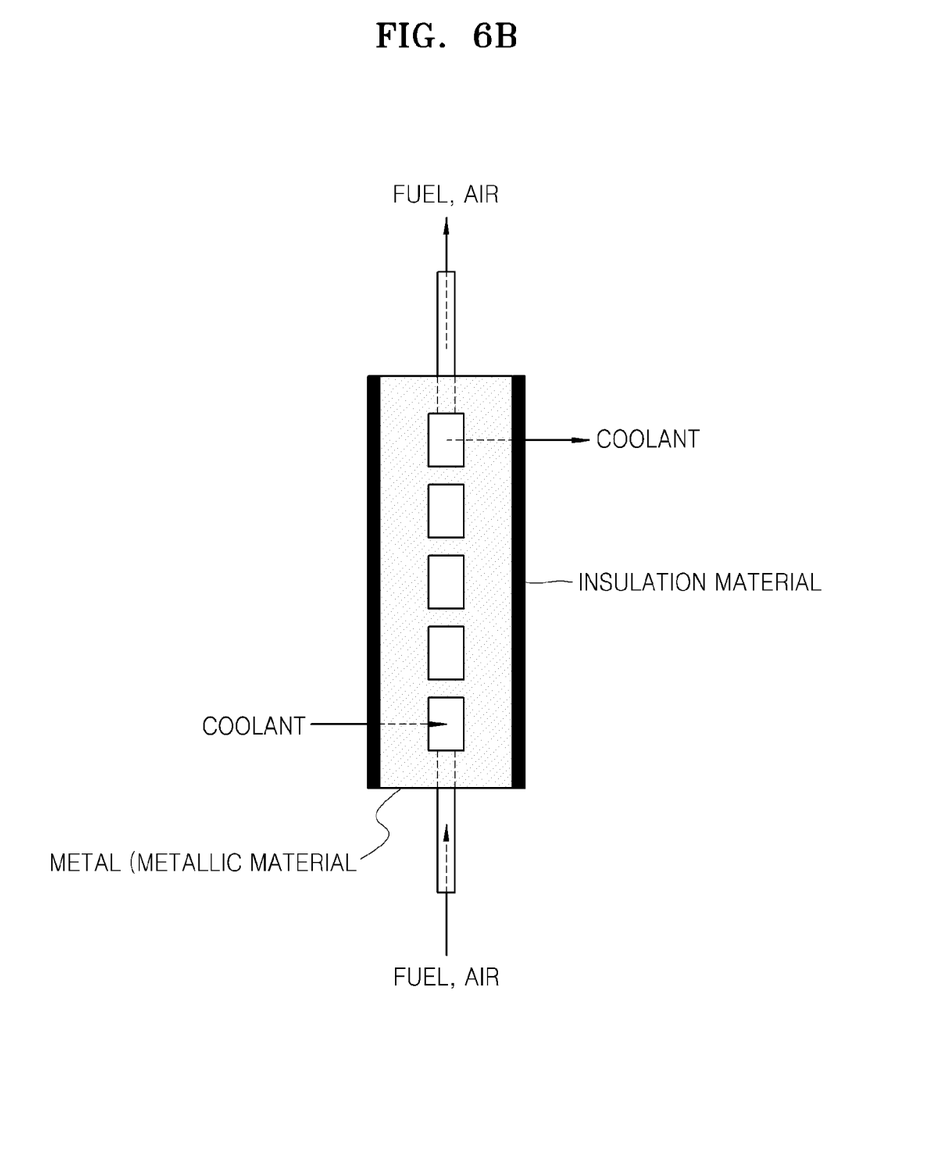

FIGS. 6A and 6B are diagrams showing other structures of the insulator plates 15 through 17 of the fuel cell stack 1 according to an embodiment of the present invention. Referring to FIGS. 6A and 6B, each of the insulator plates 15 through 17 shown in FIG. 2 has an insulating function, a coolant supplying function, and a gas supplying function at the same time. Thus, a path in which coolant flows and a path in which gas flows are formed in each of the insulator plates 15 through 17. For example, the path in which coolant flows as shown in FIG. 4A and the path in which gas flows as shown in FIG. 5A may be formed together in each of the insulator plates 15 through 17. FIGS. 6A and 6B show an example of an insulator plate in which the path in which coolant flows as shown in FIG. 4A and the path in which gas flows as shown in FIG. 5A are formed together.

FIG. 6A is a front view of the insulator plate, and FIG. 6B is a side view of the insulator plate. Referring to FIGS. 6A and 6B, a path for discharging an oxidizer (e.g. air) injected from an adjacent generation module that is in front of the insulator plate, is formed in an upper portion of the insulator plate. A path for discharging injected fuel to another adjacent generation module that is behind the insulator plate, is formed in another upper portion of the insulator plate. A path for discharging fuel injected from the adjacent generation module that is in front of the insulator plate, is formed in a lower portion of the insulator plate. A path for discharging injected air to the other adjacent generation module that is behind the insulator plate, is formed in another lower portion of the insulator plate. A channel-type path for discharging coolant injected via a hole in a side of the insulator plate via another side of the insulator plate is formed in a middle portion of the insulator plate.

As described above, according to one or more of the above embodiments, the efficiency of fuel used by a fuel cell stack may be significantly improved by operating a number of generation modules only, where the number is proportional to the quantity of power consumed by a load.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell stack, comprising:
a plurality of generation modules, each of the generation modules comprising:
a plurality of cells, each cell generating a unit of power from fuel energy, and
a plurality of current collector plates which collect the power generated by the cells; and
a plurality of insulator plates to insulate the generation modules, each insulating plate being disposed between an adjacent pair the generation modules,
wherein:
each of the insulator plates includes a path in which coolant flows to cool the cells,
an interior portion of each of the insulator plates including the path in which coolant flows is formed of a material having a heat conductivity equal to or greater than a predetermined value,
at least one of the insulator plates includes a metallic layer, and surfaces of the at least one insulator plate that contact a generating unit include an insulating material,
each of the insulator plates includes paths in which fuel or an oxidizer for oxidizing the fuel flow, and
the paths include:
a fuel exhaust path that exhausts fuel from one adjacent generation module away from the fuel cell stack in a first direction,
an oxidizer exhaust path that exhausts oxidizer from the one adjacent generation module away from the fuel cell stack in a second direction that is parallel and opposite to the first direction
a fuel injection path that is independent of the fuel exhaust path and that injects fuel into another adjacent generation module, the fuel injection path including an opening on a side of the insulator plate that faces the second direction, and
an oxidizer injection path that is independent of the oxidizer exhaust path and that injects oxidizer into the other adjacent generation module, the oxidizer injection path including an opening on a side of the insulator plate that faces the first direction.

2. The fuel cell stack of claim 1, further comprising end plates which clamp the generation modules together,
wherein:
the generation modules are stacked between the end plates, and
each of the generation modules includes cells stacked between a respective pair of the current collector plates.

3. The fuel cell stack of claim 2, wherein the end plates clamp the generation modules together at a clamping pressure at which, for each generation module, electric current flows between the cells of the generation module and between outermost cells and corresponding current collector plates connected to the outermost cells.

4. The fuel cell stack of claim 1, wherein each of the generation modules comprises a different number of the cells from numbers of cells in remaining ones of the generation modules.

5. The fuel cell stack of claim 1, with respect to each of the generation modules, further includes:
a fuel pipe that is controlled to individually supply fuel to the generation module,
an air pipe that is controlled to individually supply air to the generation module, and
a coolant pipe that is controlled to individually supply coolant to the generation module.

6. The fuel cell stack of claim 1, wherein the structure of the path is channeled, corrugated, and/or meshed.

7. The fuel cell stack of claim 1, wherein the path in each of the insulator plates includes an injection portion which injects gas into one of the generation modules and a discharge portion to discharge the injected gas from another one of the generation modules.

8. The fuel cell stack of claim 1, wherein each of the insulator plates includes:
a common path which supplies gas to each of the generation modules, and
a valve is installed at a location in the common path between a pair of the generation modules in the common path.

9. The fuel cell stack of claim 1, further comprising:
gas distribution pipes penetrating the insulator plates in the path and having holes in portions corresponding to the insulator plate, wherein the holes have different angular positions to supply the gas to a generation module selected by swiveling the gas distribution pipes.

10. The fuel cell stack of claim 1, wherein each of the insulator plates includes:
- a first portion having an oxidizer discharge path which discharges oxidizer injected from an adjacent one of the generation modules on one side of the insulator plate and a fuel discharge path which supplies injected fuel to another one of the adjacent generation modules that is on an opposite side of the insulator plate,
- a second portion having another fuel discharge path which discharges fuel injected from the adjacent generation module and another oxidizer discharge path for supplying injected oxidizer to the another adjacent generation module, and
- a third portion having a coolant path which discharges injected coolant.

11. The fuel cell stack of claim 1, wherein each of insulator plates is connected to and separates one of the current collector plates of one of the adjacent pair the generation modules and another one of the current collector plates of the other one of the adjacent pair the generation modules.

12. The fuel cell stack of claim 2, wherein each of the generation modules includes a cooling plate disposed between adjacent cells and the cooling plate supplies coolant supplied using an adjacent one of the insulator plates to cool the generation module.

13. The fuel cell stack of claim 1, wherein each of the generation modules includes a different number of cells such that each of the generation modules generates a different quantity of power.

* * * * *